Patented Feb. 3, 1953

2,627,450

UNITED STATES PATENT OFFICE 2,627,450

LIQUID INDOPHENOL SULFURIZED-VAT DYESTUFFS AND METHOD OF MAKING THEM

Ewen D. Robinson and David F. Mason, Mount Holly, N. C., assignors to Southern Dyestuff Corporation, a corporation of North Carolina No Drawing. Application October 7, 1949, Serial No. 120,215

6 Claims. (Cl. 8—37)

This invention relates to sulphurized-vat dyestuffs and more particularly to the subclass thereof known as indophenol sulphurized-vat dyestuffs. Well known examples of the latter are Hydron Blue and Indo-Carbon black types of dyestuffs, and the invention will be described hereafter by illustrative but non-limiting reference to those two examples.

An object of this invention is to produce indophenol sulphurized-vat dyestuffs, such as Hydron Blue and Indo-Carbon black, in reduced, filterable, concentrated solution form ready for dyeing.

Heretofore the Hydron Blue and Indo-Carbon black dyestuffs have been produced in paste or powder form, in which form the dyestuffs are oxidized and require a reduction treatment before they are ready for dyeing. The reduction of the paste or powder form of these dyestuffs is normally carried out by treatment with either (a) caustic soda and sodium hydrosulfite, (b) sodium sulfide and sodium hydrosulfite, or (c) a combination of (a) and (b). The Hydron Blue and Indo-Carbon black dyestuffs reduced in this manner have been used for dyeing cotton piece goods by the conventional jig method. However, the dyestuffs thus reduced have not been used very satisfactorily in other conventional dyeing procedures such as package dyeing and beam dyeing, in which a filtering out of the dyestuff on the outside and inside of the packages and beams is encountered. This is caused by the fact that the dyestuffs are not in true solution, but contain a considerable portion of solid material which deposits on the surface of the yarn and gives uneven dyeing.

The reduced dyestuffs prepared from paste or powder form in the conventional manner above described, using the alkalies caustic soda or sodium sulfide, have a very high alkalinity. Our research on this problem led us to believe that the imperfect solution and the filtering-out properties of these Hydron Blue and Indo-Carbon black types of dyestuffs were caused by this high alkalinity. Upon this premise, we discovered that if the dye solution were prepared with a very low alkalinity, i. e., the opposite of what had been used heretofore, the dyestuffs became much more soluble and would form filterable solutions substantially free of any solid matter.

Therefore, in accordance with the present invention, we have produced for the first time commercially satisfactory liquid, reduced, ready-to-dye Hydron Blue and Indo-Carbon black dyestuffs that can be used easily and effectively in practically all conventional forms of dyeing, including package dyeing, beam dyeing, jig dyeing and continuous dyeing. Furthermore, in jig dyeing procedures the liquid dyestuff of the present invention gives improved results over those heretofore obtained when starting with the paste or powder forms of Hydron Blue and Indo-Carbon black dyestuffs.

In accordance with our invention, the Hydron Blue and Indo-Carbon black liquid dyestuffs are prepared in a low-alkalinity dye solution using sodium hydrosulfide or mixtures of sodium hydrosulfide and sodium polysulfides. In this manner, we eliminate the necessity of using the strong alkalies, caustic soda and sodium sulfide, as reducing agents. The alkalinity of the concentrated dye solution is extremely low, for example, not more than about 1%, calculated as free caustic soda. This is true not only because of the elimination of the caustic soda and sodium sulfide as reducing agents, but also because of the fact that neither the sodium hydrosulfide nor the sodium polysulfides used, hydrolyze in solution to give any substantial amount of caustic soda. The sodium hydrosulfide used in the process of our present invention does not hydrolyze in the dye solution to produce any appreciable amount of caustic soda, and the sodium polysulfides, upon hydrolysis in the dye solution, produce very small amounts of free caustic soda and therefore leave the dye solution with an extremely low alkalinity, of the order of less than 1%.

For preparation of the reduced, ready to use, liquid dyestuffs in accordance with the present invention, we prefer to start with a fresh press cake of the selected dyestuff. When an alkaline press cake is used, no treatment is required except washing. If an acid press cake is used, it is first neutralized with caustic soda or sodium sulfide until the sodium salt of the dyestuff is formed. Solubilization is then continued as if we had started with an alkaline press cake. The press cakes used for producing the Hydron Blue dyestuffs are those obtained by filtering the thionation melt of carbazole indophenol, and the press cakes used for producing the Indo-Carbon black dyestuffs of this invention are those obtained by filtering the thionation melt of hydroxy phenyl betanaphthylamine.

Illustrative but non-limiting examples of the dyestuffs and their methods of preparation in accordance with the present invention are as follows:

Example 1.—Hydron Blue 100 parts of alkaline press cake as obtained upon filtering the thionation melt of carbazole indophenol, is mixed with 84 parts of sodium hydrosulfide 45%, and 816 parts water. This mixture is heated to about 90° C. and held there for approximately 30 minutes. The dyestuff dissolves and the solution is ready for use as is, or may be clarified if so desired, to remove any foreign or insoluble matter. The sodium hydrosulfide in this example, upon hydrolysis, produces a very minute amount of caustic soda and accordingly the alkalinity of the concentrated dye solution, measured in terms of free caustic soda, is substantially 0%.

Example 2.—Hydron Blue 100 parts alkaline press cake obtained upon filtering the thionation melt of carbazole indophenol is mixed with 80 parts 45% sodium hydrosulfide, 20 parts 40% sodium disulfide, 800 parts water and heated to about 90° C. and held there for approximately 30 minutes. The dyestuff dissolves, and the solution is ready for use as is, or may be clarified if so desired, to remove any foreign or insoluble matter. The sodium hydrosulfide used in this example hydrolyzes to produce only a minute amount of caustic soda, just as in Example 1 above. The sodium disulfide hydrolyzes to produce some caustic soda, but the total amount here is so small that the alkalinity of the concentrated dye solution, measured in terms of free caustic soda, is only of the order of ½%.

Example 3.—Hydron Blue 100 parts of the acid press cake obtained by acidifying the original crude press cake (prepared as in Example 2) with sulfuric acid filtered and washed, is mixed with 12 parts 60% sodium sulfide and 208 parts of water, and heated to about 90° C. 80 parts of sodium hydrosulfide 45% and 600 parts additional water are now added and the mixture stirred at 90° C. for 30 minutes. The dyestuff dissolves and the solution is ready for use, or may be clarified if so desired, to remove any foreign or insoluble matter. The sodium sulfide substantially neutralizes the acid press cake. The sodium hydrosulfide hydrolyzes in substantially the same manner as mentioned above in Example 2 and results in a very low alkalinity, as measured in terms of free caustic soda, of the order of less than 1%.

Example 4.—Hydron Blue 100 parts of the acid press cake obtained by acidifying the original crude press cake (prepared as in Example 2) with sulfuric acid filtered and washed, is mixed with 12 parts 60% sodium sulfide and 208 parts of water, and heated to 90° C. 70 parts of sodium hydrosulfide 45% and 20 parts disulfide 40% and 590 parts water are now added and the mixture stirred at 90° C. for 30 minutes. The dyestuff dissolves and the solution is ready for use, or may be clarified if so desired, to remove any foreign or insoluble matter. The sodium sulfide neutralizes the acid press cake, as above, and the sodium hydrosulfide and sodium disulfide hydrolyze to a slight extent to give an alkalinity in the dye solution of less than about 1%, based on free caustic soda.

Example 5.—Indo-Carbon black 100 parts of the alkaline press cake obtained from the thionation of 23 parts of parahydroxy phenyl betanaphthylamine is heated to 90° C. with 150 parts of water and 50 parts of 45% sodium hydrosulfide. The time of heating, subsequent operations, and alkalinity are substantially the same as those in Example 1 above.

Example 6.—Indo-Carbon black 100 parts of the acid press cake obtained by acidifying the original crude press cake obtained from the thionation of 23 parts of parahydroxy phenyl betanaphthylamine is heated with 12 parts of 60% sodium sulfide, 40 parts of 45% sodium hydrosulfide, and 148 parts of water. The time of heating, subsequent operations and alkalinity are substantially the same as those in Example 3 above.

In the foregoing examples, the sodium sulfide, polysulfides and hydrosulfide may be substituted by other alkaline sulfides which will function in a similar manner, such as, for example, potassium and ammonium sulfide, polysulfides and hydrosulfide.

Other changes and modifications in the above-described materials, processes and products may be made without departing from the scope of our invention as defined in the appended claims.

We claim:

1. A concentrated, liquid, reduced, ready-to-dye indophenol, sulphurized-vat dyestuff selected from the group consisting of Hydron Blue and Indo-Carbon black; in filterable form and having a reducing agent selected from the class consisting of sodium, potassium and ammonium hydrosulfide and polysulfides, said liquid dyestuff having an alkalinity of less than 1% calculated as caustic soda.

2. A concentrated, liquid, reduced, ready-to-dye indophenol, sulphurized-vat dyestuff in filterable form and having a reduced agent selected from the class consisting of sodium hydrosulfide and sodium polysulfides, said dyestuff being characterized by an alkalinity, calculated as caustic soda, of the order of about one per cent.

3. A concentrated, liquid, reduced, ready-to-dye Hydron Blue dyestuff, containing as the reducing agent sodium hydrosulfide and sodium polysulfide in an amount which, upon hydrolysis in the dye solution, will provide an alkalinity, calculated as caustic soda, of not more than about 1%.

4. A method of preparing a concentrated, liquid, reduced, ready-to-dye indophenol sulphurized-vat dyestuff, comprising heating a mixture of said dyestuff and a reducing agent selected from the group consisting of sodium hydrosulfide and sodium polysulfides, and continuing the heating until said dyestuff dissolves to form a substantially true solution said agents being added in an amount sufficient to solubilize said dyestuff without producing an alkalinity above 1% calculated as caustic soda.

5. A method of preparing a concentrated, liquid, reduced, ready-to-dye Hydron Blue dyestuff, comprising heating an aqueous suspension of said dyestuff with sodium hydrosulfide and sodium polysulfide until the dyestuff dissolves and a substantially true solution thereof is formed sodium hydrosulfide and sodium polysulfide being used in an amount sufficient to solubilize the dyestuff without producing an alkalinity above 1% calculated as caustic soda.

6. A method of preparing a concentrated, liquid, reduced, ready-to-dye Indo-Carbon black dyestuff, comprising heating an aqueous suspension of said dyestuff with sodium hydrosulfide and sodium polysulfide until the dyestuff dissolves and a substantially true solution thereof is formed sodium hydrosulfide and sodium polysulfide being used in an amount sufficient to solubilize the dyestuff without producing an alkalinity above 1% calculated as caustic soda.

EWEN D. ROBINSON.
     DAVID F. MASON.

REFERENCES CITED

The following references are of record in the file of this patent:

UNITED STATES PATENTS

| Number | Name | Date |
|---|---|---|
| 2,130,416 | Buchanan | Sept. 30, 1938 |

FOREIGN PATENTS

| Number | Country | Date |
|---|---|---|
| 12,327 | Great Britain | 1901 |
| 329,432 | France | May 29, 1903 |
| 429,350 | Great Britain | May 27, 1935 |